Oct. 8, 1963   D. BASTOW   3,106,076
UNIVERSAL JOINTS
Filed Oct. 9, 1961

United States Patent Office 3,106,076
Patented Oct. 8, 1963

3,106,076
UNIVERSAL JOINTS
Donald Bastow, Bearley, Stratford-on-Avon, England, assignor to Birfield Engineering Limited, London, England
Filed Oct. 9, 1961, Ser. No. 143,665
Claims priority, application Great Britain Oct. 7, 1960
13 Claims. (Cl. 64—17)

This invention relates to universal joints of the Hooke's coupling type, hereinafter termed Hooke's joints, in which two yoke members are respectively arranged for angular movement about generally perpendicular axes, and is more particularly concerned with Hooke's joints which transmit a driving torque with a degree of torsional resilience.

Hooke's joints normally have a connecting structure, in the form of a rigid central cross or outer journal bearing ring, relatively to which the yoke members are arranged for said angular movement. In an attempt to introduce torsional resilience to such a joint the normal metallic bearings between the yoke members and the connecting structure have been replaced by rubber bushes or the like so that the latter have had to withstand the full angularity of the joint, and the object of the invention is to provide a Hooke's joint which is inherently resilient without the necessity of dispensing with the normal metallic joint bearings.

According to the invention a Hooke's joint has two yoke members coupled by a connecting structure formed in two parts to which the yoke members are respectively connected and which are arranged for a limited degree of relative angular movement about the joint axis, a resilient driving connection of rubber or like resilient material being provided between the two parts. The words "joint axis" as used herein are intended to refer to the rotational axis of the joint in a condition of no angularity.

The two parts of the connecting structure may be connected by an anti-friction bearing in the form of a plain bush or a needle roller bearing with the driving connection provided by a pad or pads of the rubber or like resilient material arranged between the parts for compression when the joint is transmitting a driving torque, or they may be coupled by a bush of the rubber or like resilient material forming a bearing between them.

One part of the connecting structure may be of tubular form, with a through aperture through which the other part passes and within which it is mounted for said limited degree of relative angular movement. In this case the pads of rubber or like resilient material may be arranged between said other part and the inner wall of the through aperture of the one part of the connecting structure.

The pads may alternatively be in the form of buffers mounted on arms of one part for compression between those arms and facing arms of the other part, and these buffers are preferably mounted in cups or recesses which are completely filled by the compressed buffers just before the total angular clearance between the two parts is fully taken up.

If desired the resilient coupling may be such that torque is transmitted resiliently in both directions, and the arrangement may be such that a variable torsional rate is obtained and this torsional rate can be different for the two drive directions. This is of advantage when the joint is intended for use with the transmission shaft of a motor vehicle as it provides a different torsional rate on normal drive and on the overrun.

The parts of the connecting structure may also be mounted for relative movement along the joint axis to accommodate "plunge" of a transmission shaft with which the joint is used.

The invention will now be further described with reference to the accompanying drawings which illustrate, by way of example, two forms of Hooke's joint representing embodiments of the invention, and in which.

Figure 2:
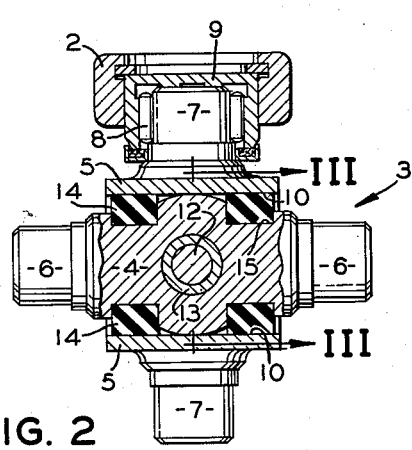
FIGURE 2 is a sectional view on the line II—II in FIGURE 1.
Figure 1:
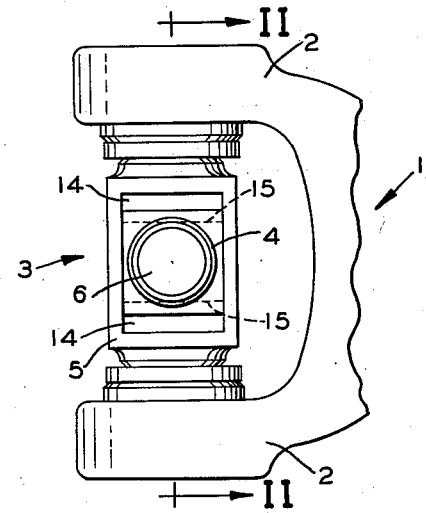
FIGURE 1 is a side view of one of the joints with one yoke member removed.
Figure 3:
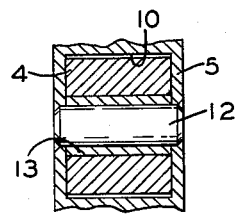
FIGURE 3 is a fragmentary sectional view on the line III—III in FIGURE 2.

Referring first to the embodiment of FIGURES 1 to 3, the Hooke's joint shown in these figures has two yoke members such as 1 of generally conventional form with yoke arms or lugs 2. The yoke members are coupled in the drive sense by a connecting structure 3, which is formed in two parts 4 and 5 to which the yoke members are respectively connected.

Each of the parts 4 and 5 has a pair of opposed journal pegs, 6, 6 or 7, 7 received in needle bearings such as 8 (see FIGURE 2) retained in a bearing thimble 9 mounted in the corresponding yoke arm 2 in the usual manner.

The pair of journal pegs 6, 6 or 7, 7 of each part 4 or 5 are coaxial, and when the joint is not transmitting torque the axes of the two pairs are as usual coplanar and arranged at right angles to each other as shown in the drawings. However, in contrast to the usual arrangement, the two parts 4 and 5 of the connecting structure are arranged for a limited degree of relative angular movement in the plane containing the axes of the journal pegs 6 and 7.

To enable such limited relative angular movement to occur the part 5 is of tubular form with a through aperture 10 of rectangular cross-section, the longitudinal axis of this aperture being aligned with the common axis of the journal pegs 6. The part 4 is mounted within the aperture 10 of the part 5 so that the journal pegs 6, 6 project from opposite ends thereof, and the part 4 is located within the aperture by a cross pin 12 the ends of which are fixed in the part 5 and which passes through a bearing bush 13 fitted centrally within the part 4. This forms an anti-friction bearing about which relative angular movement of the two parts 4 and 5 can occur.

Relative angular movement of the parts 4 and 5, from the unloaded condition shown in the drawings, is opposed resiliently by four elongated rubber pads 14 of rectangular cross-section which are retained in grooves 15 in the part 4 and which engage the inner wall of the aperture 10 adjacent the journal pegs 7, 7. Thus relative angular movement of the parts 4 and 5 in either direction is opposed and limited by compression of two of the rubber pads 14. As a result a drive is transmitted between the yoke members of the joint with a degree of torsional resilience, and it will be clear that two of the rubber pads 14 act to transmit the drive in one angular direction between the parts 4 and 5 whereas the other two pads 14 come into use when the drive is in the opposite direction.

The two yoke members 1 are of similar form, particularly as regards the yoke arms 2 and the association thereof with the journal pegs 6 or 7. The member 1 illustrated in FIGURES 1 and 2 is broken away in FIGURE 1, and its end remote from the yoke arms 2 may be formed for welding to a tubular shaft or form part of a sliding joint to accommodate plunge of a shaft with which the joint is used, in known manner, or flanged.

Figure 4:
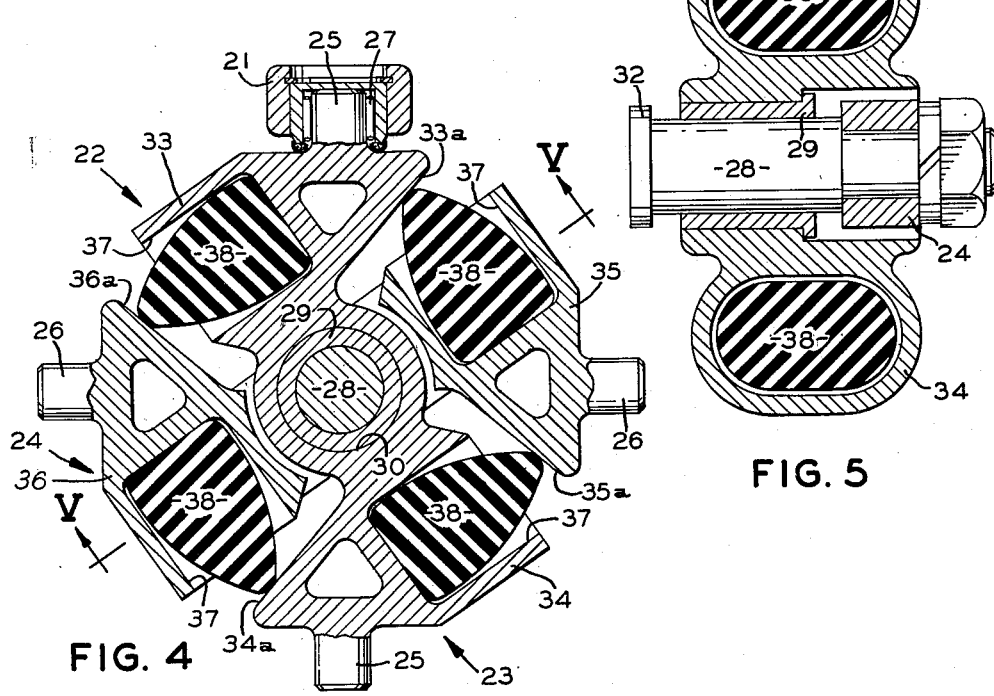
FIGURE 4 is a lateral sectional view of the other joint in the plane containing the journal pegs of the joint.
Figure 5:
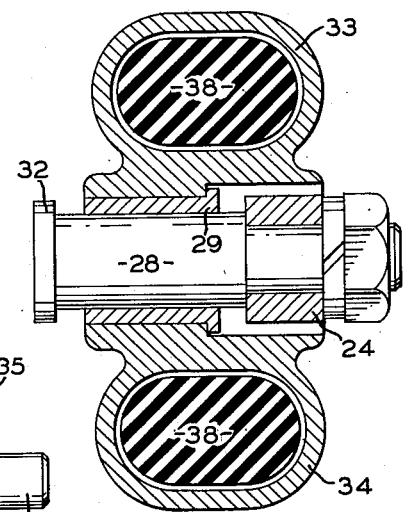
FIGURE 5 is a sectional view on the line V—V in FIGURE 4.

The embodiment of FIGURES 4 and 5 transmits a drive with torsional resilience in a generally similar manner, but the joint illustrated in these two figures has the additional advantage that it is capable of accommodating plunge of a transmission shaft with which it is used. As before, the joint has two yoke members of generally conventional form, only one of which is illustrated partly in section at 21 in FIGURE 4, and which are coupled in the drive sense by a connecting structure 22 formed in two parts 23 and 24 to which the yoke members are respectively connected. Each of the parts 23 and 24 again has opposed journal pegs 25 or 26 received in needle bearings such as 27 of the corresponding yoke member 21 in the usual manner.

The part 24 is attached to one end of a bearing pin 28 which is aligned with the joint axis and provides a bearing for a bush 29 mounted in a through bore 30 in the part 23. Movement of the bush 29 along the pin 28 is limited by a head 32 of the latter which thus limits the maximum plunge which can be accommodated by the joint.

The part 23 has two arms 33 and 34 which project radially of the bush 29, and the corresponding journal pegs 25 are formed on these arms. The part 24 is in the shape of a yoke with an intermediate arm in which the bearing pin 28 is mounted and two side arms 35 and 36 on which the corresponding journal pegs 26 are formed. The part 23 is received centrally between the side arms of part 24, and the two arms 33 and 34 extend axially of the joint between the two arms 35 and 36 so that the arms of the two parts could engage in pairs to limit relative angular movement of the parts 23 and 24 about the joint axis but for the interposition of rubber buffers 38 which will now be described.

Each of the arms 33, 34, 35 or 36 has a recess 37 which faces in a common direction about the joint axis towards an adjacent arm 36, 35, 33 or 34 of the other part of the connecting structure 22. Each recess 37 provides a housing for one of the rubber pads or buffers 38 which are of elongated shape axially of the joint with a tapering rounded nose in lateral cross-section (as shown in FIGURE 4) and which respectively project from the corresponding recesses 37.

Each arm 33, 34, 35 or 36 has a plane surface 33a, 34a, 35a or 6a for engagement by the corresponding buffer 38 of the other part 23 or 24 of the connecting structure 22, and the arrangement is such that the buffers 38 are compressed to fill the recesses 37 completely just before the two pairs of arms 33, 34 and 35, 36 interengage to limit the relative angular movement of the parts 23 and 24.

In a similar manner to that already described in connection with the joint of FIGURES 1 to 2, the drive is transmitted between the yoke members of the joint through the rubber buffers 38, the two buffers 38 of the part 23 acting to transmit the drive in one angular direction whereas the other two buffers 38 of the other part 24 come into use when the drive is in the opposite direction. The change in cross-section of the buffers 38 and their arrangement in the recess 37 provides a variable torsional rate, and plunge is accommodated by sliding movement of the bush 29 along the bearing pin 28.

I claim:

1. A journal cross, for use in a Hooke type universal joint including driving and driven members each having a pair of opposed lugs with the lugs of the members in an interfitting relationship, comprising in combination,
    a. a first and a second pair of opposed pegs with one pair of pegs operative to be pivotally connected to the lugs of one of said members and the other pair operative to be pivotally connected to the lugs of said other member,
    b. separate means integrally connecting each pair of said pairs of opposed pegs,
    c. said separate connecting means being circumferentially rotatable relative to each other,
    d. and resilient means drivingly engaging said separate connecting means and cushioningly inhibiting said relative circumferetial rotation.

2. A journal cross according to claim 1 wherein one of said connecting means has a central opening therein and the other connecting means passes through said central opening.

3. A journal cross according to claim 2 wherein said resilient means drivingly engages said connecting means within said central opening.

4. A journal cross according to claim 2 wherein said central opening is rectangular in cross section, and the portion of said other connecting means disposed within said central opening is rectangular in cross section.

5. The combination according to claim 1 wherein said separate connecting means are axially movable relative to each other.

6. A journal cross according to claim 1 wherein one of said separate connecting means has a central opening therein of rectangular cross section, the other connecting means has a portion thereof of rectangular cross section disposed within said opening, and said resilient means engages said connecting means within said central opening.

7. A journal cross for use in a Hooke type universal joint including opposed driving and driven members each having a pair of opposed lugs with the lugs of the members in an interfitting relationship comprising in combination,
    a. a first and a second pair of opposed pegs with one pair of pegs operative to be pivotally connected to the lugs of one of said members and the other pair operative to be pivotally connected to the lugs of said other member,
    b. separate means integrally connecting each pair of said pairs of opposed pegs,
    c. said separate connecting means being circumferentially rotatable relative to each other,
    d. axially extending means pivotally connecting said connecting means,
    e. and resilient means drivingly engaging said connecting means and cushioningly inhibiting said circumferential rotation.

8. A journal cross according to claim 7 wherein
    a. receiving means is carried by said separate connecting means, and
    b. said resilient means include a plurality of elastomeric elements, with at least a portion of said elements being disposed in said receiving means of one of said separate connecting means and the remaining portion of said elastomeric elements engaging another connecting means.

9. A journal cross according to claim 8 wherein each of said separate connecting means includes a central portion and a pair of opposed arms extending radially therefrom and carrying said pegs on the radial outer end thereof, and said central portions are operatively connected by said axially extending means.

10. A journal cross according to claim 9 wherein the arms of at least one of said connecting means includes at least one of said receiving means, each of said receiving means having a portion of an elastomeric element disposed therein and the remaining portion of said elastomeric element projecting circumferentially therefrom and engaging an arm of another connecting means.

11. A journal cross for use in a Hooke type universal joint including opposed driving and driven members each having a pair of opposed lugs with the lugs of the members in interfitting relationship comprising in combination,
    a. a first and a second pair of opposed pegs with one pair of pegs operative to be pivotally connected to the lugs of one of said members and the other pair adapted to be pivotally connected to the lugs of said other member,
b. separate means integrally connecting each pair of said pair of opposed pegs,
c. said separate connecting means including a central portion having a pair of opposed arms extending radially therefrom with each arm carrying one of said pegs on the radially outer end thereof,
d. axially extending means joining the central portion of said connecting means for relative circumferential rotation and axial movement,
e. receiving means formed in each of said arms,
f. a plurality of resilient elements with one of said plurality of elements being received in the receiving means of each of said arms and having a portion thereof extending circumferentially therefrom and drivingly engaging another of said arms,
g. whereby said arms are drivingly and cushioningly connected by said elastomeric elements.

12. A journal cross, according to claim 11 wherein said separate connecting means are disposed in axial juxtaposition, and said axially extending means includes a connecting member fixedly secured to one of said separate connecting means and received in the central portion of the other integral connecting means for relative rotation and axial movement.

13. A journal cross according to claim 11 wherein the extending portion of said plurality of resilient elements face the same way in the angular sense so that two of the elements transmit drive in one direction and the other two transmit drive in the opposite direction.

References Cited in the file of this patent

UNITED STATES PATENTS

| | | |
|---|---|---|
| 1,548,629 | Pfander | Aug. 4, 1925 |
| 1,707,309 | Leipert | Apr. 2, 1929 |
| 1,942,746 | Degener | Jan. 9, 1935 |